(12) United States Patent
Paulussen et al.

(10) Patent No.: US 11,299,244 B2
(45) Date of Patent: Apr. 12, 2022

(54) UV LED WAVEGUIDE SYSTEM WITH SCATTERING FOR ANTI-FOULING

(71) Applicant: KONINKLIJKE PHILIPS N.V., Eindhoven (NL)

(72) Inventors: Elvira Johanna Maria Paulussen, Reppel-Bocholt (BE); Bart Andre Salters, Eindhoven (NL); Hugo Johan Cornelissen, Escharen (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/200,955

(22) Filed: Mar. 15, 2021

(65) Prior Publication Data

US 2021/0197937 A1    Jul. 1, 2021

Related U.S. Application Data

(63) Continuation of application No. 16/469,423, filed as application No. PCT/EP2017/082949 on Dec. 15, 2017, now Pat. No. 10,967,940.

(30) Foreign Application Priority Data

Dec. 16, 2016 (EP) ..................... 16204760

(51) Int. Cl.
*B63B 59/04* (2006.01)
*F21V 8/00* (2006.01)
*G02B 6/10* (2006.01)

(52) U.S. Cl.
CPC ............ *B63B 59/04* (2013.01); *G02B 6/0021* (2013.01); *G02B 6/0041* (2013.01); *G02B 6/0068* (2013.01); *G02B 6/102* (2013.01)

(58) Field of Classification Search
USPC ....................................... 250/492.1
See application file for complete search history.

(56) References Cited

U.S. PATENT DOCUMENTS

| 4,444,146 A | 4/1984 | De Wirtz |
|---|---|---|
| 5,513,930 A | 5/1996 | Eathorne |
| (Continued) | | |

FOREIGN PATENT DOCUMENTS

| WO | 2014188347 A1 | 11/2014 |
|---|---|---|
| WO | 2015000756 A1 | 1/2015 |
| WO | 2016000980 A1 | 1/2016 |

OTHER PUBLICATIONS

Henyey, L. et al., "Diffuse radiation in the galaxy", Astrophysical Journal, 93: 70-83, 1941.

(Continued)

*Primary Examiner* — Phillip A Johnston

(57) ABSTRACT

The invention provides a waveguide element (1000) comprising a first face (1001) and a second face (1002) with radiation transmissive material (1005) configured between the first face (1001) and the second face (1002), wherein the radiation transmissive material (1005) is transmissive for UV radiation, wherein the radiation transmissive material (1005) is a matrix material for a phase (1010) of another composition than the radiation transmissive material (1005), wherein the phase (1010) is available in the matrix as regions (1110) with the regions (1110) having mean particle radii (r1) selected from the range of 50-1500 nm and having an average region concentration selected from the range of $1*10^4$-$1.5*10^8$/mm$^3$ of the radiation transmissive material (1005).

14 Claims, 7 Drawing Sheets

(56) References Cited

U.S. PATENT DOCUMENTS

| | | |
|---|---|---|
| 7,577,318 B2 | 8/2009 | Monch |
| 7,920,769 B2 | 4/2011 | Nakada |
| 8,459,196 B2 | 6/2013 | Provencher |
| 10,252,783 B2 | 4/2019 | Salters |
| 10,712,470 B2 | 7/2020 | Vasbo |
| 10,967,940 B2 * | 4/2021 | Paulussen ............ G02B 6/0068 |
| 2004/0126272 A1 | 7/2004 | Bornstein |
| 2010/0187987 A1 | 7/2010 | Nakamura |
| 2013/0048877 A1 | 2/2013 | Thoren et al. |
| 2016/0193632 A1 | 7/2016 | Vahida |

OTHER PUBLICATIONS

International Search Report and Written Opinion, International Application No. PCT/EP2017/082949, dated Apr. 13, 2018.
Evans, L. V. 1981 "Marine algae and fouling: a review, with particular reference to shipfouling", Bot. Mar. 24, 167-171.
"Biodiversity", Department of Conservation, https://www.doc.govt.nz/biodiversity, Accessed Jun. 2019.
Thornber, C. S., Kinlan, B. P., Graham, M. H. & Stachowicz, J. J. 2004 Population ecology of the invasive kelp *Undaria pinnatifida* in California: environmental and biological controls on demography. Mar. Ecol. Prog. Ser. 268, 69-80.

* cited by examiner

UV LED WAVEGUIDE SYSTEM WITH SCATTERING FOR ANTI-FOULING

CROSS-REFERENCE TO PRIOR APPLICATIONS

This application a continuation of U.S. application Ser. No. 16/469,423 filed Jun. 13, 2019 which claims the benefit of International Application No. PCT/EP2017/082949 filed on Dec. 15, 2017 which claims the benefit of European Patent Application No. 16204760.9 filed Dec. 16, 2016. These applications are hereby incorporated by reference herein.

FIELD OF THE INVENTION

The invention relates to a waveguide element which can e.g. be used for anti-fouling, especially in combination with a light source. The invention further relates to an anti-fouling system (or anti-biofouling system) comprising such waveguide and also comprising a light source. The invention also relates to an object including such anti-fouling system or anti-biofouling system.

BACKGROUND OF THE INVENTION

Systems for anti-biofouling are known in the art. WO2014/188347, for instance, describes a method of anti-fouling of a protected surface, while the protected surface is at least partially submersed in a liquid environment, in particular an aqueous or oily environment, the method comprising providing an anti-fouling light; providing an optical medium in close proximity to the protected surface, the optical medium having a substantially planar emission surface; distributing at least part of the anti-fouling light through the optical medium in a direction substantially parallel to the protected surface; and emitting the anti-fouling light from the emission surface of the optical medium in a direction away from the protected surface.

WO2015/000756 describes a light-guiding member comprising a light transmissive, solid carrier material, and scattering particles of boron nitride dispersed in said carrier material. The light-guiding member is employed in a light emitting arrangement comprising a solid state light emitting element arranged to emit light into the light guiding member via a light input surface. Light can be guided within the light-guiding member to be outcoupled via at least part of a light output surface. The light emitting arrangement provides a simple and efficient illumination device for UV disinfection of water and other fluids.

SUMMARY OF THE INVENTION

Biofouling or biological fouling (herein also indicated as "fouling" or "biofouling") is the accumulation of microorganisms, plants, algae, and/or animals on surfaces. The variety among biofouling organisms is highly diverse and extends far beyond attachment of barnacles and seaweeds. According to some estimates, over 1700 species comprising over 4000 organisms are responsible for biofouling. Biofouling is divided into microfouling which includes biofilm formation and bacterial adhesion, and macrofouling which is the attachment of larger organisms. Due to the distinct chemistry and biology that determine what prevents organisms from settling, these organisms are also classified as hard or soft fouling types. Calcareous (hard) fouling organisms include barnacles, encrusting bryozoans, mollusks, polychaete and other tube worms, and zebra mussels. Examples of non-calcareous (soft) fouling organisms are seaweed, hydroids, algae and biofilm "slime". Together, these organisms form a fouling community.

In several circumstances biofouling creates substantial problems. Machinery stops working, water inlets get clogged, and hulls of ships suffer from increased drag. Hence the topic of anti-fouling, i.e. the process of removing or preventing fouling from forming, is well known. In industrial processes, bio-dispersants can be used to control biofouling. In less controlled environments, organisms are killed or repelled with coatings using biocides, thermal treatments or pulses of energy. Non-toxic mechanical strategies that prevent organisms from attaching include choosing a material or coating with a slippery surface, or creation of nanoscale surface topologies similar to the skin of sharks and dolphins which only offer poor anchor points. Biofouling on the hull of ships causes a severe increase in drag, and thus increased fuel consumption. It is estimated that an increase of up to 40% in fuel consumption can be attributed to biofouling. As large oil tankers or container transport ships can consume up to €200.000 a day in fuel, substantial savings are possible with an effective method of anti-biofouling.

It surprisingly appears that one may effectively use UV radiation to substantially prevent biofouling on surfaces that are in contact with sea water or water in lakes, rivers, canals, etc.

Herewith, an approach is presented based on optical methods, in particular using ultra-violet light or radiation (UV). It appears that most micro-organisms are killed, rendered inactive or unable to reproduce with sufficient UV light. This effect is mainly governed by the total dose of UV light. A typical dose to kill 90% of a certain micro-organism is 10 mWh/m$^2$ (especially permanently applied).

It appears that prior art waveguides are less efficient in preventing or reducing biofouling then desired. Hence, it is an aspect of the invention to provide an alternative waveguide, or system comprising such waveguide, which preferably further at least partly obviate(s) one or more of above-described drawbacks.

It (surprisingly) appeared that if clear (transparent) silicone is used as medium to transport UV radiation to the exit surface, the efficiency in reducing or preventing biofouling is lower than desirable. Hence, though a highly transparent waveguide or optical medium seems desirable, this appears less useful in practice. It surprisingly appears that the efficiency can be increased when introducing particles in the waveguide, though it also appears that this effect is especially obtained with in a limited range of particle sizes and a limited range of particle concentrations.

Hence, the invention provides in a first aspect a waveguide element (which may also be indicated as "wave guide" or "light guide" or "optical medium" or "element") comprising radiation transmissive material (which may also be indicated as "light transmissive material" or "material"), wherein the radiation transmissive material is transmissive for UV radiation, wherein the radiation transmissive material is a matrix material for a phase of another composition than the radiation transmissive material, wherein the phase is available in the matrix as regions (herein sometimes also indicated as "particles") with the regions having mean particle radii (r1), especially selected from the range of 50-1500 nm, and having an average region concentration, especially selected from the range of $1*10^4$-$1.5*10^8$/mm$^3$ of the radiation transmissive material, and in embodiments especially having a volume fraction of the regions selected from the range of 0.00003-3 vol. %, especially selected from the range of 0.0001-1 vol. %, even more especially selected from the range of 0.0005-0.5 vol. %, such as 0.0005-0.2 vol. %. Further, especially the waveguide element comprises a first face and a second face with the radiation transmissive material configured between the first face and the second face. The radiation transmissive material is especially configured as matrix for the radiation transmissive material.

Such waveguide may allow an efficient distribution of light, especially UV radiation, of a light source over one or more of the first face and the second face. In this way, the waveguide can be used as efficiently anti-fouling element. Via one or both faces UV radiation can be coupled out, leading to removal of biofouling or inhibition of biofouling or biofouling growth.

Hence, in a further aspect the invention also provides an anti-biofouling system (herein also indicated as "system" or "anti-biofouling system") comprising a light source configured to provide UV radiation and the waveguide element as defined herein, wherein the light source and the waveguide element are adapted for propagation of at least part of the UV radiation through the radiation transmissive material and subsequent emanation from at least one of the first face and the second face.

Such system can be used for preventing or reduction of biofouling. The radiation emanating from one (or both) of the face(s) can be used for removal of biofouling or inhibition of biofouling (growth). The radiation per se may be used, for instance by providing such anti-fouling radiation to a surface to be cleaned from or protected for biofouling. However, also the first face and/or second face can be used as external surface of an object, thereby providing the object an alternative surface which may be less prone to biofouling. Note that radiation may escape from one or more faces, also from more faces than the herein indicated first and second face, dependent upon the shape of the waveguide. The face, or part of the face, of which the UV radiation may escape from the waveguide (for providing the anti-fouling radiation) is herein also indicated as "UV radiation exit face".

Therefore, in yet a further aspect the invention also provides an object comprising an object surface and the anti-biofouling system as defined herein, wherein at least one of the first face and the second face of said anti-biofouling system is configured as at least part of said object surface, and wherein in a first state the anti-biofouling system is configured to provide UV radiation emanating from said at least one of the first face and a second face. The term "in a first state" indicates that there is at least one setting with essentially fixed conditions. In general, such first state is the state wherein the system is in use. Hence, the term "first state" may also refer to an "on state". Would the system be controllable, then there may be different "on states". In such embodiment, there may be a first state, a second state, and optionally further states. This may e.g. be the case for systems which can be in use with (continuously) variable conditions. Here, the term "condition" may e.g. refer to intensity of the light of the source light.

As indicated above, the invention especially provides a waveguide element, which can be used for a system, as further also described below. The waveguide comprises a first side and a second side. In principle, the waveguide may have an essentially circular cross-section. In such instance, the first and the second side may also define a diameter of the waveguide. In general however, the waveguide may have a plate-like shape or a beam-like shape, especially a plate-like shape, though the waveguide is not necessarily essentially planar. The waveguide may be curved. For instance, the waveguide may include one or more sides that are curved, or the waveguide may comprise a flexible material and may be curved (in an operation position) because the waveguide is applied to a curved surface, etc. As the waveguide in most of the embodiments may have a plate-like or beam-like shape, the waveguide is defined as having a first face and a second face. The first face and the second face may define the thickness or height of the waveguide. The waveguide element may have a thickness (h1) defined by the distance between the first face and the second face selected from the range of 0.1-500 mm, such as 0.5-500 mm, like 1-200 mm such as 2-100 mm, like 2-20 mm. Would a fiber-like waveguide be applied, this thickness may refer to the diameter of the fiber-like waveguide (or optionally (also) to the length, would the length be smaller than the diameter).

As indicated above, the waveguide comprises radiation transmissive material configured between the first face and the second face. In fact, the radiation transmissive material may provide the first face and the second face, like e.g. a silicone slab or a slab of another radiation transmissive material. Hence, e.g. a plate of radiation transmissive material may define the first face and the second face, as oppositely arranged faces.

The radiation transmissive material is essentially impermeable to water, especially in the sense that migration of water from one face to another face is essentially zero, such as at atmospheric pressure and at room temperature less than 0.01 mg/day/m$^2$, such as even less than 1 µg/day/m$^2$, like especially equal to or less than 0.1 µg/day/m$^2$ of the waveguide. Hence, the material and thickness may be chosen such that essentially no water may permeate through the waveguide.

In contrast, light may be transmitted through the material, as the waveguide may function as window. Hence, the waveguide element comprises radiation transmissive material. The waveguide is especially transmissive for UV radiation. Hence, basically, when UV radiation is provided at one of the faces of the element, part of the UV radiation will be transmitted through the waveguide, optionally after (multiple) scattering, and escape from the waveguide (e.g. at the other face). Therefore, the waveguide especially comprises a radiation transmissive material, such as glass, quartz, (fused) silica, silicone, fluoropolymer etc., especially the radiation transmissive material comprises one or more of a silicone and a fluoropolymer, especially the radiation transmissive material comprises a silicone, e.g. Lumisil, especially Lumisil 400, from Wacker or similar materials. Hence, the waveguide element comprises radiation transmissive material, i.e. a material that is transmissive for UV radiation.

The waveguide is not necessarily transmissive for all wavelengths and is also not necessarily entirely transmissive for all radiation. Hence, the waveguide is transmissive for at least part of the UV radiation. Especially, the waveguide is adapted to transmit at least 25%, such as at least 50%, such as at least 75%, like at least 90% of the anti-fouling radiation. In other words, the light source is configured relative to the waveguide (optionally the light source being embedded in the waveguide) (in such a way) and the waveguide is chosen such that at least 25% of the total number of photons of the radiation provided to the waveguide also escapes from the waveguide. The transmission or radiation permeability can be determined by providing radiation at a specific wavelength with a first intensity to the material and relating the intensity of the radiation at that wavelength measured after transmission through the material, to the first intensity of the radiation provided at that specific wavelength to the material (see also E-208 and E-406 of the CRC Handbook of Chemistry and Physics, 69th edition, 1088-1989).

In specific embodiments, a material may be considered transmissive when the transmission of the radiation at a wavelength or in a wavelength range, especially at a wavelength or in a wavelength range of radiation generated by a source of radiation, through a 1 mm thick layer of the material, especially even through a 5 mm thick layer of the material, under perpendicular irradiation with said radiation is at least about 50%, such as at least about 75%, such as even at least about 80%.

Yet further, the radiation transmissive material is a matrix material for a phase of another composition than the radiation transmissive material, wherein the phase is available in the matrix as regions. Here, the term "phase" is used, like is similarly also used in context like a water-in-oil phase. Hence, a kind of phase-in-phase is provided, with the former phase referring to the other material, and the latter phase referring to the matrix material, such as silicone, etc.

The composition of the matter in the regions may especially be different from the surrounding matrix material. The regions may comprise gas filled cavities, liquid filled cavities, or essentially consist of solid material. The regions are relatively small regions and may also be indicated as particles. Though the regions may be irregularly shaped, a largest aspect ratio (of a largest to a smallest dimension) will in (number) average be smaller than 10 and/or a smallest aspect ratio will in (number) average be larger than 0.1. The term dimension may refer to length, width, height, and diameter. In case the region is perfectly spherical, the aspect ratio is one as the smallest and largest dimension or both the diameter (as there is in fact no smallest or largest dimension, but only a diameter). In general, the particles can be considered to be (essentially) spherical particles. The regions (or particles) have mean particle radii ($r1$) selected from the range of 50-1500 nm, especially selected from the range of 100-1250 nm, such as selected from the range of 350-1200 nm. The term "radius" thus essentially refers to the equivalent spherical radius (similar like the definition of the equivalent spherical diameter (or ESD)). The equivalent spherical radius of an irregularly shaped object is the radius of a sphere of equivalent volume. Alternatively or additionally, regions (or particles) have an average region concentration selected from the range of $1*10^4$-$1.5*10^8$/mm$^3$ of the radiation transmissive material, such as selected from the range of $5*10^4$-$1*10^7$/mm$^3$, like selected from the range of $1*10^5$-$1.5*10^6$/mm$^3$. Hence, by way of example 1 mm$^3$ of radiation transmissive material may include $1.5*10^7$ particles of 200 nm, or 1 mm$^3$ of radiation transmissive material may include $1.5*10^5$ particles of 1200 nm, etc. In this way, a balance may be found between transmission and light outcoupling. Further, with the herein described invention the radiation coupled out at one of the faces, or both, may be most intense and most effectively be distributed, thereby allowing a smaller number of light sources, which save energy and (other) resources.

In a specific embodiment, the regions have mean particle radii $r1$ (in nm) and an average region concentration $c1$ (in/mm$^3$) defined by the range $c1=a*(10^b)*(x^d)$, wherein $0.5 \leq a \leq 4$; $7 \leq b \leq 15$; $-3.0 \leq d \leq -1.0$; $x=r1$; and 50 nm$\leq r1 \leq$1500 nm, more especially 100 nm$\leq r1 \leq$1000 nm.

The volume fraction of regions may in embodiments be selected from the range of about 0.00003-3 vol. %, like about 0.0003-1.5 vol. %, such as 0.003-0.5 vol. %, like 0.01-0.2 vol. %.

Herein, the terms "average" and "mean" may especially refer to number average and a mean values based on the number of elements (such as here regions).

In embodiments, one or more regions consist of at least 80% vol. % of a gas, or even essentially 100 vol. %. Hence, a small void may be filled with gas, especially entirely filed with the gas, which thereby provides a kind of gas particle. In specific embodiments, a plurality of regions, such as at least 50% of all the regions consists of at least 80% vol. % of a gas, especially 100 vol. %, or even essentially 100% of all regions. When less than 100 vol. % of the gas is comprised in a small void, the remainder may e.g. a liquid such as water. The gas may be air, or nitrogen gas, or carbon dioxide, etc. etc. The term "gas" may also refer to a gas mixture, such as air etc. The gas voids may be introduced during production of the waveguide, such as during production of the silicone or other polymer.

In yet further embodiments, one or more regions consists of at least 80% vol. % of a liquid, such as water, or even essentially 100 vol. %. In specific embodiments, a plurality of regions, such as at least 50% of all the regions consists of at least 80% vol. % of liquid, even more especially 100 vol. % such as water, or even essentially 100% of all regions. When less than 100 vol. % of the liquid is comprised in a small void, the remainder may e.g. gas, such as air. The term "liquid" may also refer to a mixture of liquids, such as water and ethanol, etc. The liquid particles may be introduced during production of the waveguide, such as during production of the silicone or other polymer.

In further embodiments, the one or more regions comprise solid particles. Especially, the solid particles comprise radiation reflective material, such as especially material that is reflective for UV radiation. In specific embodiments, the one or more regions comprise solid particles selected from the group consisting of silicon dioxide, aluminum oxide, titanium dioxide, boron nitride, magnesium oxide, barium sulphate, calcium carbonate, zirconium dioxide and zinc oxide. In specific embodiments, a plurality of regions, such as at least 50% of all the regions comprises such particles, or even essentially 100% of all regions. The regions may be completely filled with the solid material, or may also comprise one or more of a liquid and a gas. Especially, the regions are entirely filed with the solid material. In other word, the particles define the regions. The term "solid particles" may refer to particles all consisting of the same material, or to particles consisting of different materials. Further, the particles may also comprise mixtures of two or more of the above materials. Hence, in embodiments the regions are solid particles.

Due to the presence of the other phase, such as the other phase comprising another material, the UV radiation propagating through the radiation transmissive material is scattered, leading to a better distribution and/or outcoupling. However, as indicated above, the number and dimension of regions are chosen such that a compromise may be found between efficient outcoupling and good distribution over one or both of the surfaces.

Especially, the regions have a different index of refraction (or indices of refraction when different materials for the phase are applied) than the matrix material. This may enhance scattering. Therefore, in specific embodiments the radiation transmissive material and the phase have (in average) an absolute difference of indices of refraction larger than zero, especially selected from the range of 0.04-0.8, like selected from the range of 0.06-0.7.

Optionally, in (other) embodiments the radiation transmissive material and the phase may be essentially the same material but have different structures (like different crystallinities, or crystalline and amorphous, etc.).

Further, it appears that good results can be obtained when the waveguide element has a Henyey Greenstein mean free path selected from the range of 0.2-30, especially 0.2-15 mm, such as 0.5-12 mm, and has a Henyey Greenstein anisotropy factor selected from the range of 0.8-0.95. Amongst others, it is referred to L. G. Henyey, J. L. Greenstein, Diffuse radiation in the galaxy, Astrophysical Journal 93:70-83, 1941, which is herein incorporated by reference.

As indicated above, the invention also provides an anti-biofouling system comprising a light source configured to provide UV radiation and the waveguide element as defined herein, wherein the light source and the waveguide element are adapted for propagation of at least part of the UV radiation through the radiation transmissive material and subsequent emanation from at least one of the first face and a second face. The combination of waveguide element and light source configured to provide UV radiation may also be indicated as "UV-emitting element". Instead of the phrase "subsequent emanation" also the term (subsequent) emission or escape, as the radiation escapes from the element.

In embodiments, the light source is configured external from the waveguide element. In yet other embodiments, the light source may be configured at least partly within the waveguide element. In the former embodiments, a light emitting surface, such as a LED die is external from the waveguide element, whereas in the latter embodiments especially the light emitting surface (such as a LED die) is configured within the waveguide element. Hence, in such embodiments the light emitting surface may in embodiment be in physical contact with the radiation transmissive material. Hence, in specific embodiments the light source is at least partly embedded in the waveguide element, or may even entirely be embedded in the waveguide element.

Especially, the light source has an optical axis (O) (i.e. a beam of light generated by the light source has such optical axis), wherein the light source is configured with the optical axis (O) perpendicular to one or more of the first face and the second face. This may provide the largest spot at one of the surfaces that receive the light source light and may thus potentially reduce biofouling or prevent biofouling. The spot may in embodiments be essentially round. In yet other embodiments, the light source is configured with the optical axis (O) parallel to one or more of the first face and the second face. This may lead to a spot that deviates from circular. This spot is herein also indicated as "clean diameter", though the spot is not necessarily perfectly circular.

In specific embodiments, the light source is configured to provide UVC radiation. In yet other embodiments, a combination of one or more of UVA, UVB and UVC is provided. Below some further specific embodiments are described.

In further embodiments, the anti-biofouling system comprises a plurality of light sources, wherein each light source has a light emitting surface, and wherein the light sources have shortest distances (d1) between neighboring light emitting surfaces selected from the range of 0.5-100, such as 1-100 mm, like 1-50 mm, such as 5-50 mm, like 5-25 mm. With the specifically chosen scattering, the distance between light sources may be relatively large.

When a plurality of light sources is applied, such light sources may especially be configured in a grid, with interconnected light sources (see also below), especially configured parallel. In specific embodiments, all one or more light sources are configured with the optical axes essentially perpendicular to one or both faces. In yet other embodiments, all one or more light sources are sources are configured with the optical axes essentially parallel to one or both faces. In yet further embodiments, there may be two or more subsets of light sources, which each (one or more) light source(s) within the subset with the optical axes aligned parallel, but with the optical axes of light sources of different subsets configured non-parallel (including anti-parallel). For instance, a plurality of light sources may be configured with the optical axis essentially parallel to one or both faces and a plurality of light sources may be configured with the optical axis essentially perpendicular to one or both faces. For instance, such light sources may be configured in 2D arrays with different light sources configured alternating.

As indicated also above, the invention further provides an object comprising an object surface and the anti-biofouling system as defined herein, wherein at least one of the first face and the second face of said anti-biofouling system is configured as at least part of said object surface, and wherein in a first state the anti-biofouling system is configured to provide UV radiation emanating from said at least one of the first face and a second face.

As indicated above, in a further aspect the invention provides an object that during use may be at least partly submerged in water, the object comprising the anti-biofouling system as defined herein, wherein the anti-biofouling system is configured to irradiate with UV radiation during an irradiation stage one or more of (i) a part of a surface of said object and (ii) water adjacent to said part of said surface. As indicated above, the object may especially be selected from the group consisting of a vessel and an infrastructural object, etc. Therefore, in embodiments the object is selected from the group consisting of an immobile marine object, a mobile marine object, like a (motorized) marine object, such as a (motorized) vessel, an infrastructural element, and a windmill.

Herein, the phrase "object that during use is at least partly submerged in water" especially refers to objects such as vessels and infrastructural objects that have aquatic applications. Hence, during use such object will be in general in contact with the water, like a vessel in the sea, a lake, a canal, a river, or another waterway, etc. The term "vessel" may e.g. refer to e.g. a boat or a ship, etc., such as a sail boat, a tanker, a cruise ship, a yacht, a ferry, a submarine, etc. etc. The term "infrastructural object" may especially refer to aquatic applications that are in general arranged substantially stationary, such as a dam, a sluice, a pontoon, an oilrig, etc. etc. The term "infrastructural object" may also refer pipes (for e.g. pumping up ocean water to e.g. a power plant), and other parts of (hydro-electrical) power plants, such as cooling systems, turbines, etc. The term "surface" especially refers to the surface that may be in physical contact with water. In the case of pipes this may apply to one or more of the internal pipe surface and the external pipe surface. Hence, instead of the term "surface" also the term "fouling surface" may be applied. Further, in such embodiments the term "water line" may also refer to e.g. filling level. Especially, the object is an object configured for marine applications, i.e. application in or near to a sea or an ocean. Such objects are during their use at least temporarily, or substantially always, at least partly in contact with the water. The object may be at least partly below the water (line) during use, or may substantially be all of its time below the water (line), such as for submarine applications. The invention may e.g. be applied for marine anti-fouling, keeping wetted surfaces clean, for off-shore applications, for (sub) sea applications, for drilling platforms, etc.

Due to this contact with the water, biofouling may occur, with the above indicated disadvantages. Biofouling will occur at the surface of a surface of such object. The surface of an (element of the) object to be protected may comprise steel, but may optionally also comprise another material, such as e.g. selected from the group consisting of wood, polyester, composite, aluminium, rubber, hypalon, PVC, glass fiber, etc. Hence, instead of a steel hull, the hull may also be a PVC hull or a polyester hull, etc. Instead of steel, also another iron material, such as an (other) iron alloys may be used Herein, the term "fouling" or "biofouling" or "biological fouling" are interchangeably used. Above, some examples of fouling are provided. Biofouling may occur on any surface in water, or close to water and being temporarily exposed to water (or another electrically conductive aqueous liquid). On such surface biofouling may occur when the element is in, or near water, such as (just) above the water line (like e.g. due to splashing water, such as for instance due to a bow wave). Between the tropics, biofouling may occur within hours. Even at moderate temperatures, the first (stages of) fouling will occur within hours; as a first (molecular) level of sugars and bacteria.

The anti-biofouling system comprises at least an UV-emitting element. Further, the anti-biofouling system may comprise a control system (see also below), an electrical energy supply, etc.

The term "anti-biofouling system" may also refer to a plurality of such systems, optionally functionally coupled to each other, such as e.g. controlled via a single control system. Further, the anti-biofouling system may comprise a plurality of such UV-emitting elements. Herein, the term "UV-emitting element" may (thus) refer to a plurality of UV-emitting elements. For instance, in an embodiment a plurality of UV-emitting elements may be associated to an surface of the object, such as a hull, or may be comprised by such surface (see also below), whereas e.g. a control system may be configured somewhere within the object, such as in a control room or wheel house of a vessel.

The surface or area on which fouling may be generated is herein also indicated as fouling surface. It may e.g. be the hull of a ship and/or an emission surface of an optical medium (see also below). To this end, the UV-emitting element provides UV radiation (anti-fouling light) that is applied to prevent formation of biofouling and/or to remove a biofouling. This UV radiation (anti-fouling light) especially at least comprises UV radiation (also indicated as "UV light"). Hence, the UV-emitting element is especially configured to provide UV radiation. Thereto, the UV-emitting element comprises a light source. The term "light source" may also relate to a plurality of light sources, such as 2-20 (solid state) LED light sources, though many more light sources may also be applied. Hence, the term LED may also refer to a plurality of LEDs. Especially, the UV-emitting element may comprise a plurality of light sources. Hence, as indicated above, the UV-emitting element comprises one or more (solid state) state light sources. The LEDs may be (OLEDs or) solid state LEDs (or a combination of these LEDs). Especially, the light source comprises solid state LEDs. Hence, especially, the light source comprises a UV LED configured to provide one or more of UV-A and UVC light (see also below). UV-A may be used to impair cell walls, whereas UVC may be used to impair DNA. Hence, the light source is especially configured to provide the UV radiation. Herein, the term "light source" especially refers to a solid state light source. The light source(s) may also include (a) solid state laser(s).

Especially, the light source or the light sources is (are) LEDs. Hence, in embodiments the anti-biofouling system comprises a plurality of light sources, wherein the light sources comprise LEDs. Alternatively or additionally, the light sources comprise solid state lasers.

Ultraviolet (UV) is that part of electromagnetic light bounded by the lower wavelength extreme of the visible spectrum and the X-ray radiation band. The spectral range of UV light is, by definition between about 100 and 400 nm (1 nm=$10^{-9}$ m) and is invisible to human eyes. Using the CIE classification the UV spectrum is subdivided into three bands: UVA (long-wave) from 315 to 400 nm; UVB (medium-wave) from 280 to 315 nm; and UVC (short-wave) from 100 to 280 nm. In reality many photobiologists often speak of skin effects resulting from UV exposure as the weighted effect of wavelength above and below 320 nm, hence offering an alternative definition.

A strong germicidal effect is provided by the light in the short-wave UVC band. In addition erythema (reddening of the skin) and conjunctivitis (inflammation of the mucous membranes of the eye) can also be caused by this form of light. Because of this, when germicidal UV-light lamps are used, it is important to design systems to exclude UVC leakage and so avoid these effects. In case of immersed light sources, absorption of UV light by water may be strong enough that UVC leaking is no problem for humans above the liquid surface. Hence, in an embodiment the UV radiation (anti-fouling light) comprises UVC light. In yet another embodiment, the UV radiation comprises radiation selected from a wavelength range of 100-300 nm, especially 200-300 nm, such as 230-300 nm. Hence, the UV radiation may especially be selected from UVC and other UV radiation up to a wavelength of about 300 nm. Good results are obtained with wavelengths within the range of 100-300 nm, such as 200-300 nm. Especially, the light sources may be light sources having peak wavelength selected from the range of 255-290 nm, such as 260-280 nm.

As indicated above, the UV-emitting element may be configured to irradiate with said UV radiation (during an irradiation stage) one or more of (i) said part of said surface and (ii) water adjacent to said part of said surface. The term "part" refers to part of surface of an object, such as e.g. a hull or a sluice (door). However the term "part" may also refer to substantially the entire surface, such as the surface of the hull or sluice. Especially, the surface may comprise a plurality of parts, which may be irradiated with the UV light of one or more light sources, or which may be irradiated with the UV radiation of one or more UV-emitting elements. Each UV-emitting element may irradiate one or more parts. Further, there may optionally be parts that receive UV radiation of two or more UV-emitting elements.

In general, there may be distinguished between two main embodiments. One of the embodiments includes the part of the surface being irradiated with the UV radiation with between the light source and UV-emitting element water (or air when above the water line), such as sea water, at least during the irradiation stage. In such embodiment, the part is especially comprised by the "original" surface of the object. However, in yet another embodiment, the "original" surface may be extended with a module, especially a relatively flat module, that is attached to the "original" surface of the object (such as the hull of a vessel), whereby the module itself forms in fact the surface. For instance, such module may be associated to the hull of a vessel, whereby the module forms (at least part of) the surface. In both embodiments the UV-emitting element especially comprises a radiating exit surface (see further also below). However, especially in the latter embodiment wherein the UV-emitting element may provide part of said surface, such radiation exit face may provide the part (as the first part and the radiation exit face may essentially coincide; especially may be the same surface).

Hence, in an embodiment the UV-emitting element is attached to said surface. In yet a further specific embodiment the radiation exit face of the anti-biofouling system is configured as part of said surface. Hence, in some of the embodiments the object may comprise a vessel comprising a hull, and the UV-emitting element is attached to said hull. The term "radiation exit face" may also refer to a plurality of radiation exit faces (see also below).

In both general embodiments, the UV-emitting element is configured to irradiate with said UV radiation (during an irradiation stage) water adjacent to said part of said surface. In the embodiments wherein the module itself forms in fact the surface, the UV-emitting element is at least configured to irradiate with said UV radiation (during an irradiation stage) said part of said surface, as it is in fact part of said surface, and optionally also water adjacent to said part of said surface. Hereby, biofouling may be prevented and/or reduced.

In an embodiment, a significant amount of a protected surface to be kept clean from fouling, preferably the entire protected surface, e.g. the hull of a ship, may be covered with a layer that emits germicidal light ("anti-fouling light"), in particular UV light.

In yet another embodiment, the UV radiation (anti-fouling light) may be provided to the surface to be protected via a waveguide, such as a fiber.

Hence, in an embodiment the anti-fouling lighting system may comprise an optical medium, wherein the optical medium comprises a waveguide, such as an optical fiber, configured to provide said UV radiation (anti-fouling light) to the fouling surface. The surface of e.g. the waveguide from which the UV radiation (anti-fouling light) escapes is herein also indicated as emission surface. In general, this part of the waveguide may at least temporarily be submerged. Due to the UV radiation (anti-fouling light) escaping from the emission surface, an element of the object that is during use at least temporarily exposed to the liquid (such as seawater), may be irradiated, and thereby anti-fouled. However, the emission surface per se may also be anti-fouled. This effect is used in some of the embodiments of the UV-emitting element comprising an optical medium described below.

Embodiments with optical media are also described in WO2014188347. The embodiments in WO2014188347 are herein also incorporated by reference as they are combinable with the control unit and/or water switch, and other embodiments, described herein.

As indicated above, the UV-emitting element may especially comprise a UV radiation exit face. Hence, in a specific embodiment the UV-emitting element comprises a UV radiation exit face, with the UV-emitting element especially being configured to provide said UV radiation downstream from said UV radiation exit face of said UV-emitting element. The UV radiation exit face may be the surface of a waveguide. Hence, UV radiation may be coupled in the UV-emitting element into the waveguide, and escape from the element via a (part of a) face of the waveguide. As also indicated above, in embodiments the radiation exit face may optionally be configured as part of the surface of the object.

Especially, the (solid state) light source is at least controllable between a first UV radiation level and a second UV radiation level, wherein the first UV radiation level is larger than the second UV radiation level (and wherein the second UV radiation level is smaller than the first radiation level or may even be zero). Hence, in an embodiment the light source can be switched off and can be switched on (during a radiation stage). Further, optionally also the intensity of the UV radiation may be controlled between these two stages, such as a stepwise or continuous UV radiation intensity control. Hence, the light source is especially controllable (and thus its UV radiation intensity is).

As indicated above, the object or the anti-biofouling system may comprise a plurality of radiation exit faces. In embodiments this may refer to a plurality of anti-biofouling systems. However, alternatively or additionally, in embodiments this may refer to an anti-biofouling system comprising a plurality of UV radiation emitting elements. Such anti-biofouling system may thus especially include a plurality of light sources for providing UV radiation. However, alternatively or additionally, in embodiments this may (also) refer to an UV-emitting element comprising a plurality of light sources configured to provide the UV radiation. Note that an UV-emitting element with a single UV radiation exit face may (still) include a plurality of light sources.

Especially when the UV-emitting element comprises a plurality of light sources and a plurality of UV radiation exit faces, especially with each of such surface addressed by one or more light sources, and/or when the bio-fouling system comprises a plurality of UV-emitting elements, by a control of the light sources it is possible to address different parts of the surface independently. Hence, by arranging the different UV radiation exit faces at different heights of the object (with the height especially defined during use of the object), it is possible to substantially only irradiate with UV radiation only those parts for which applies that one or more of the part and the UV radiation exit face are below the water (line).

Hence, in a specific embodiment the anti-biofouling system comprises a plurality of light sources, a plurality of radiation exit faces, and a plurality of said parts, wherein the plurality of light sources are configured to provide said UV radiation via said plurality of radiation exit faces to said plurality of parts, and wherein said plurality of parts are configured at different heights of the object. Especially, the control system may be configured to control the (solid state) light sources individually as function of said input information. For instance, in a specific embodiment the control system may be configured to control the light sources individually as function of the positions of the parts of the surface relative to the water (i.e. the water line).

The anti-biofouling system is especially configured to provide UV radiation to the part of the object or to water adjacent to this part. This especially implies that during an irradiation stage the UV radiation is applied. Hence, there may optionally also be periods wherein no UV radiation is applied at al. This may (thus) not only be due to e.g. a control system switching of one or more of the UV-emitting elements, but may e.g. also be due to predefined settings such as day and night or water temperature, etc. For instance, in an embodiment the UV radiation is applied in a pulsed way.

Hence, in a specific embodiment or aspect, the anti-biofouling system is configured for preventing or reducing biofouling on a fouling surface of an object that during use is at least temporarily exposed to water, by providing an anti-fouling light (i.e. UV radiation) to said fouling surface or water adjacent thereto. Especially, the anti-biofouling system may be configured to provide said anti-fouling light via an optical medium to said fouling surface, wherein the UV-emitting element further comprises (ii) said optical medium configured to receive at least part of the UV radiation (anti-fouling light), the optical medium comprising an emission surface configured to provide at least part of said UV radiation (anti-fouling light). Further, especially the optical medium comprises one or more of a waveguide and an optical fiber, and wherein the UV radiation (anti-fouling light) especially comprises one or more of UVB and UVC light. These waveguides and optical media are herein further not discussed in detail.

The optical medium may also be provided as a (silicone) foil for applying to the protected surface, the foil comprising at least one light source for generating anti-fouling light and a sheet-like optical medium for distributing the UV radiation across the foil. In embodiments the foil has a thickness in an order of magnitude of a couple of millimeters to a few centimeters, such as 0.1-5 cm, like 0.2-2 cm. In embodiments, the foil is not substantially limited in any direction perpendicular to the thickness direction so as to provide substantially large foil having sizes in the order of magnitude of tens or hundreds of square meters. The foil may be substantially size-limited in two orthogonal directions perpendicular to the thickness direction of the foil, so as to provide an anti-fouling tile; in another embodiment the foil is substantially size-limited in only one direction perpendicular to a thickness direction of the foil, so as to provide an elongated strip of anti-fouling foil. Hence, the optical medium, and even also the UV-emitting element, may be provided as tile or as strip. The tile or strip may comprise a (silicone) foil. Tiles or strips are embodiments of beams or plates (see also above).

In an embodiment the UV-emitting element comprises a two-dimensional grid of light sources for generating UV radiation and the optical medium is arranged to distribute at least part of the UV radiation from the two-dimensional grid of light sources across the optical medium so as to provide a two-dimensional distribution of UV radiation exiting the light emitting surface of the light module. The two-dimensional grid of light sources may be arranged in a chicken-wire structure, a close-packed structure, a rows/columns structure, or any other suitable regular or irregular structure. The physical distance between neighboring light sources in the grid may be fixed across the grid or may vary, for example as a function of light output power required to provide the anti-fouling effect or as function of the location of the UV-emitting element on the protected surface (e.g. location on the hull of a ship). Advantages of providing a two-dimensional grid of light sources include that the UV radiation may be generated close to the areas to be protected with UV radiation illumination, and that it reduces losses in the optical medium or light guide and that it is increasing homogeneity of the light distribution. Preferably, the UV radiation is generally essentially homogeneously distributed across the emission surface; this reduces or even prevents under-illuminated areas, where fouling may otherwise take place, while at the same time reducing or preventing energy waste by over-illumination of other areas with more light than needed for anti-fouling. In an embodiment, the grid is comprised in the optical medium. In yet another embodiment, the grid may be comprised by a (silicone) foil.

Further, in an embodiment the optical medium may be disposed proximate (including optionally attached to) the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

In a further aspect, the invention also provides a method of anti-(bio)fouling (a part of) a surface of an object that is during use at least temporarily exposed to water, the method comprising: providing the anti-biofouling system as defined herein to the object, generating the UV radiation (during use of the object), optionally as function of one or more of (i) a feedback signal, and (ii) a timer for (periodically) varying the intensity of the UV radiation (anti-fouling light), and providing said UV radiation (during an irradiation stage) to (the part of) the surface. Such feedback signal may be provided by the sensor.

In yet a further aspect, the invention also provides a method of providing an anti-biofouling system, as defined herein, to an object, that during use may at least temporarily be exposed to water, the method comprising providing, such as integrating in the object and/or attaching to an object surface, the anti-biofouling system to the object with the anti-biofouling system configured to provide said UV radiation to one or more of a part of an object surface of the object and water adjacent to said part.

The terms "upstream" and "downstream" relate to an arrangement of items or features relative to the propagation of the light from a light generating means (here especially the light source), wherein relative to a first position within a beam of light from the light generating means, a second position in the beam of light closer to the light generating means is "upstream", and a third position within the beam of light further away from the light generating means is "downstream".

In a specific embodiment, the light source comprises a solid state light source (such as a LED or laser diode). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The element or system may include (further) optics like reflectors, optical filters, additional light sources, etc. etc. For instance, one or more reflectors may be used to redirect radiation back into the waveguide which escapes from faces which are not configured as light escape face or light exit face. Herein, especially the first face is used as example as (single) light exit face.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
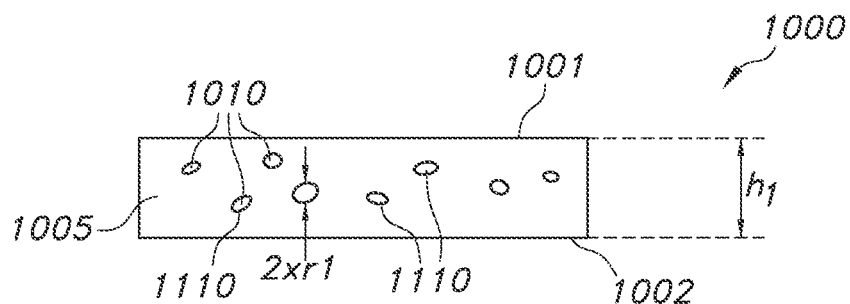
FIGS. 1a-1f schematically depict some aspects of the invention.

FIG. 1a (and further) schematically depicts an embodiment of a waveguide element 1000 comprising a first face 1001 and a second face 1002 with radiation transmissive material 1005 configured between the first face 1001 and the second face 1002. As indicated above, the radiation transmissive material 1005 is transmissive for UV radiation. The radiation transmissive material 1005 is a matrix material for a phase 1010 of another composition than the radiation transmissive material 1005, wherein the phase 1010 is available in the matrix as regions 1110 with the regions 1110 having mean particle radii r1 selected from the range of 50-1500 nm. The diameter of the particles is indicated with 2*r1. The transmissive material may have an average region concentration selected from the range of $1*10^4$-$1.5*10^8$/mm$^3$ of the radiation transmissive material 1005. Reference h1 indicates the height or thickness of the waveguide element 1000. Sometimes, the waveguide element is herein also indicated as slab, and the height is indicated as slab height.

Figure 1B:
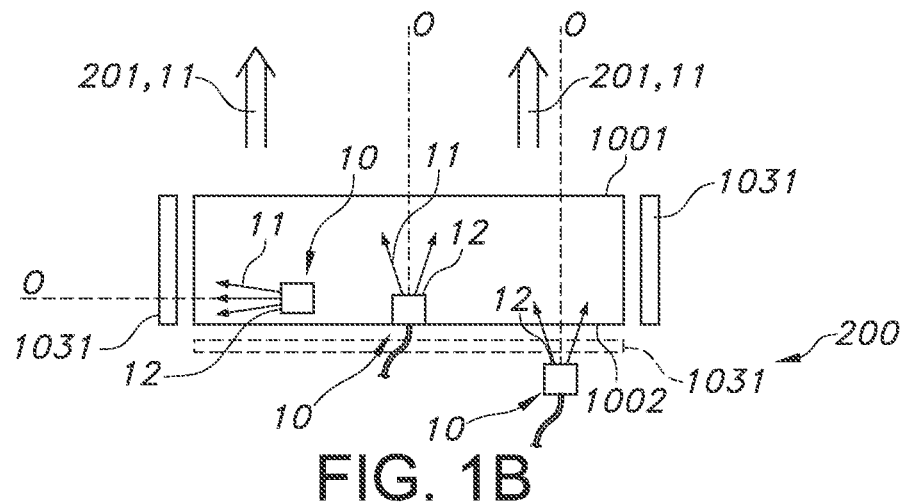

FIG. 1b schematically depicts an embodiment of an anti-biofouling system 200 comprising a light source 10, such as a solid state light source, configured to provide UV radiation 11 and the waveguide element 1000 as defined herein. The light source 10 and the waveguide element 1000 are adapted for propagation of at least part of the UV radiation 11 through the radiation transmissive material 1005 and subsequent emanation from at least one of the first face 1001 and a second face 1002. By way of example, one or more mirrors 1031 may be configured to reflect radiation that escapes from the waveguide back into the waveguide, especially when such radiation escapes from parts where it is undesirable that the radiation escapes. A semi transparent optical filter may be used between the light source 10 and the waveguide. With such configuration it may be possible to have the radiation escape from the waveguide 1000 essentially only from one or more desired faces, here first surface 1001.

The radiation that escapes from the waveguide is indicated as device radiation 201. This device radiation may also be indicated as anti-fouling radiation or anti-biofouling radiation or system radiation. The device radiation 201 comprises at least part of the UV radiation, though due to the scattering and some absorption within the waveguide 1000 the spectral distribution may be (slightly) different from the radiation directly escaping from the light source 10. The face of the light source from which the (UV) radiation escapes is indicated with light emitting surface 12.

Further, by way of example different configurations of the light source are schematically depicted. The light source 10 may be configured external from the waveguide 1000. However, the light source may also be partly embedded in the waveguide, as shown in the middle, and the light source 10 may essentially entirely be embedded in the waveguide 1000 as shown on the left of FIG. 1b. Further, the optical axis of the light source 10 may be configured perpendicular to the light escaping surface and/or the light entrance surface or parallel to the light escaping surface and/or light entrance surface. Here, in embodiments such as schematically depicted in FIGS. 1b (and 1c) first surface 1001 is a light escaping surface or anti-biofouling surface and second surface 1002 may be configured as light entrance surface (FIG. 1b, right light source 10). Reference O indicates the optical axis of the light source(s) 10. As indicated above, the waveguide is transmissive for at least part of the UV radiation. Dependent upon the configuration of the light source(s) 10 this may impose conditions on the waveguide material and region concentration and region particle size. Therefore, at least part of the UV radiation 11 is transmitted through the radiation transmissive material 1005 and emanates from the first face 1001 (or optionally the second face 1002).

Figure 1C:
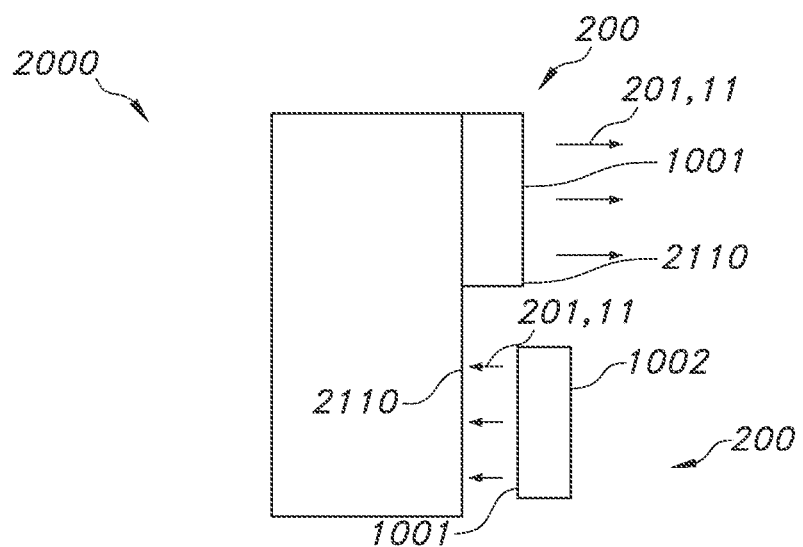

FIG. 1c schematically depicts an embodiment of an object 2000 comprising an object surface 2110 and the anti-biofouling system 200 as described herein. At least one of the first face 1001 and the second face 1002 of said anti-biofouling system 200 is configured as at least part of said object surface 2110, and wherein in a first state the anti-biofouling system 200 is configured to provide UV radiation 11 emanating from said at least one of the first face 1001 and a second face 1002. Here, again the first surface 1001 is chosen as radiation escape surface of the waveguide 1000.

Note that alternative configurations may also be possible. For instance, the anti-biofouling system may also be configured with the waveguide 1000 at some distance of the object surface 2110, and irradiation with anti-fouling radiation the object surface 2110 (shown for the lower anti-biofouling system 200 in FIG. 1c).

Figure 1D:
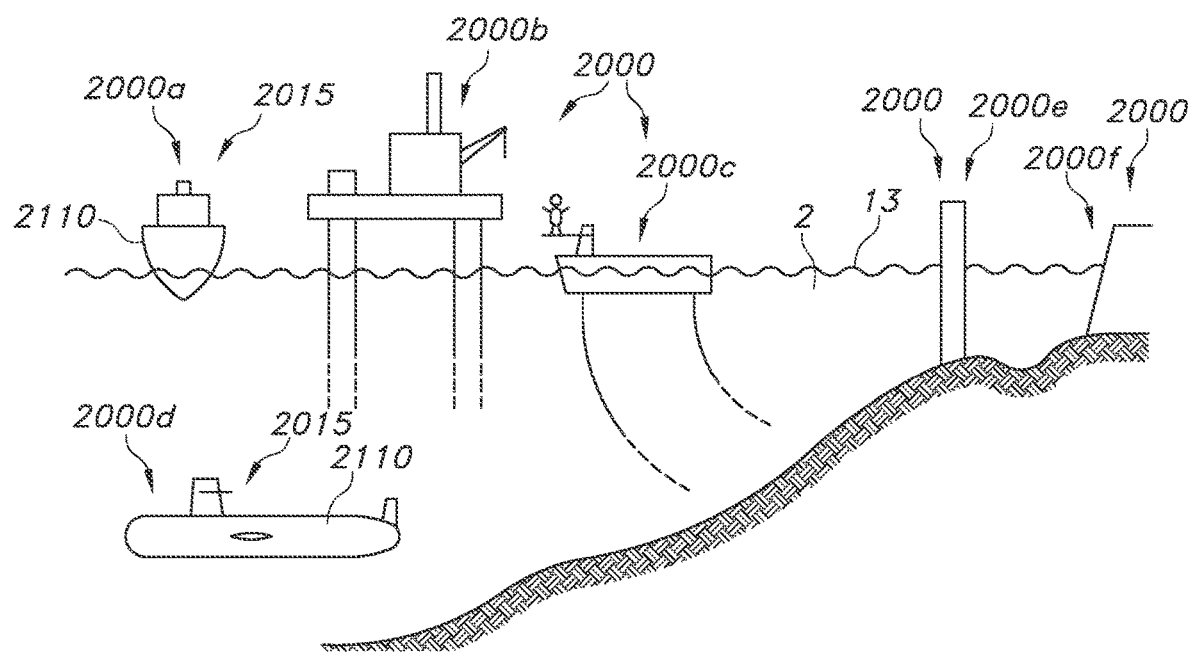

FIG. 1d schematically depict embodiments of objects 2000 that during use may be at least partly submerged in water 2, see the water line 13, though the invention is not limited to such embodiments. The object 2000, such as a vessel or a sluice, see also below, further comprises an anti-biofouling system 200 comprising an UV-emitting element, here the waveguide 1000, especially for application of UV radiation 11 to a part of an (external) surface 2110 of the object 2000, such as a hull or part or a hull. With reference to FIG. 1c, two embodiments are shown wherein the anti-biofouling system 200, more especially the waveguide 1000, may be part of an outer surface, and thereby forms in fact part of the outer surface (FIG. 1c upper option) or wherein the anti-biofouling system 200, more especially the waveguide 1000, is configured to irradiate the outer surface and does not necessarily form part of an outer surface, such as a hull of a ship. For instance, the object 2000 is selected from the group consisting of a vessel 2015 and an infrastructural object. The term "vessel", indicated with reference 2015, may e.g. refer to e.g. a boat or a ship (ref 2000a in FIG. 1d), etc., such as a sail boat, a tanker, a cruise ship, a yacht, a ferry, a submarine (ref 2000d in FIG. 1d), etc. etc., like schematically indicated in FIG. 1d. The term "infrastructural object", may especially refer to aquatic applications that are in general arranged substantially stationary, such as a dam/sluice (references 2000e/2000f in FIG. 1d), a pontoon (ref 2000c in FIG. 1d), an oilrig (ref 2000b in FIG. 1d), etc. etc.

Figure 1E:
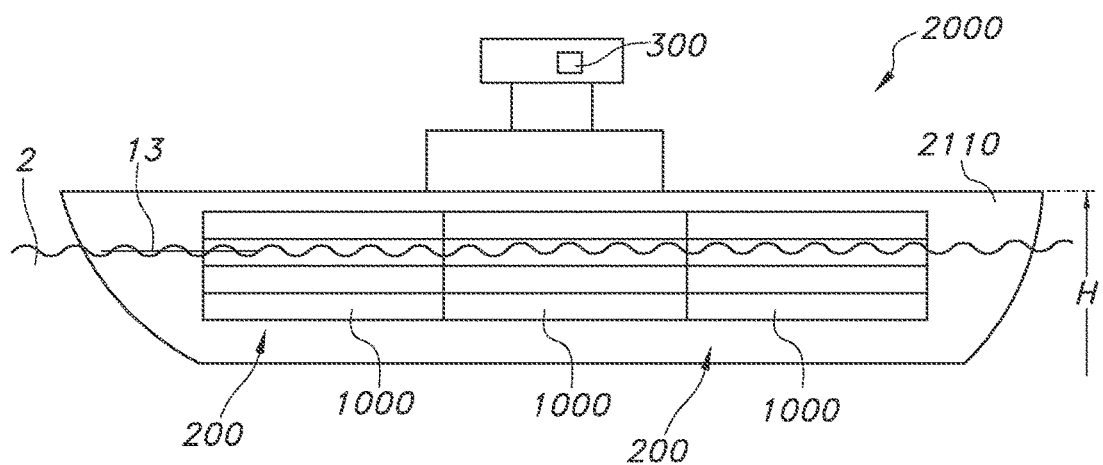

FIG. 1e schematically depicts an embodiment wherein a vessel 2015, as embodiment of the object 2000, comprises a plurality of anti-biofouling systems 200 and/or a one or more of such anti-biofouling systems 200 comprising a plurality of waveguides 1000. Dependent upon the height of the specific such anti-biofouling system 200 and/or the height of the waveguides 1000, such as relative to a water (line), the respective anti-biofouling systems 200 may be switched on. FIG. 1e schematically depicts a control system 300, configured to control the anti-biofouling system(s). However, the application of a control system is not limited to the schematically depicted embodiment of FIG. 1e. The term "controlling" especially refers to determining the behavior or supervising the running of the light source, especially thus one or more of the intensity and the spectral distribution, especially at least the intensity.

Figure 1F:
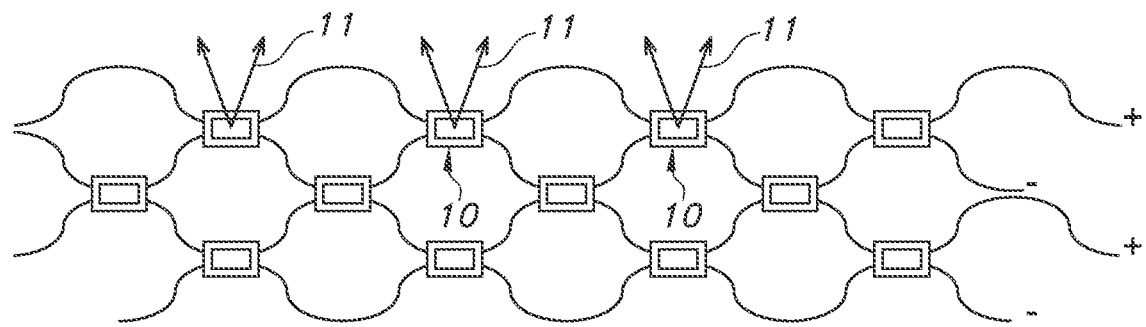

FIG. 1f shows a chicken-wire embodiment where light sources 10, such as UV LEDs, are arranged in a grid and connected in a series of parallel connections. The LEDs can be mounted at the nodes either through soldering, glueing or any other known electrical connection technique for connecting the LEDs to the chicken wires. One or more LEDs can be placed at each node. DC or AC driving can be implemented. If AC is used, then a couple of LEDs in anti-parallel configuration may be used. The person skilled in the art knows that at each node more than one couple of LEDs in anti-parallel configuration can be used. The actual size of the chicken-wire grid and the distance between UV LEDs in the grid can be adjusted by stretching the harmonica structure. The chicken-wire grid may be embedded in an optical medium (such as the herein described waveguide). The optical axes of the light sources may be all directing in the same direction, but one or more optical axis may also be configured orthogonal to one or more other optical axes; further configurations may also be possible.

Anti-fouling systems can be equipped with UV LEDs embedded in silicone light guides. The function of the light guide is to transport the UV radiation further from the LED source towards the exit surface of the light guide, coinciding with the fouling surface. The area per UV LED being kept clean from fouling depends amongst others on the orientation of the UV LED inside the light guide: direct lit, optical axis of UV LED perpendicular to exit surface, or side lit, optical axis parallel to the exit surface.

It appears that the 'clean area' is symmetrical for the direct lit system and asymmetrical for the side lit system. The term 'clean diameter' is another term for 'clean area' and is for the side lit system measured into the direction of the z-axis of the LED. Because the clean diameter (herein also indicated as clean area, as the area is not necessarily perfectly circular) measured into direction of the z-axis of the LED optical axis is slightly smaller than into perpendicular direction, the first is specified (less optimal case).

Further, it appears that the clean diameter depends on the amount of scattering. If the amount of scattering is too low, most of the (downstream) radiation effectively contributing to the large clean area, will be minimal. If the amount of scattering is too large, the most of the radiation exits the light guide nearby the LED, and the clean diameter will also be small. The optimal scattering parameters for the largest possible clean diameter is herein defined.

If clear (transparent) silicone is used as medium to transport UV radiation to the exit surface, the absorption dominates travelling distance. This means that most of the UV radiation is absorbed by the silicone before it reaches an (exit) surface of the light guide.

If the silicone medium contains the proper scattering parameters, the clean diameter at the exit surface is increased by the gradual outcoupled (redirected) UV radiation (so, the local irradiance at larger diameter is increased).

Figure 2A:
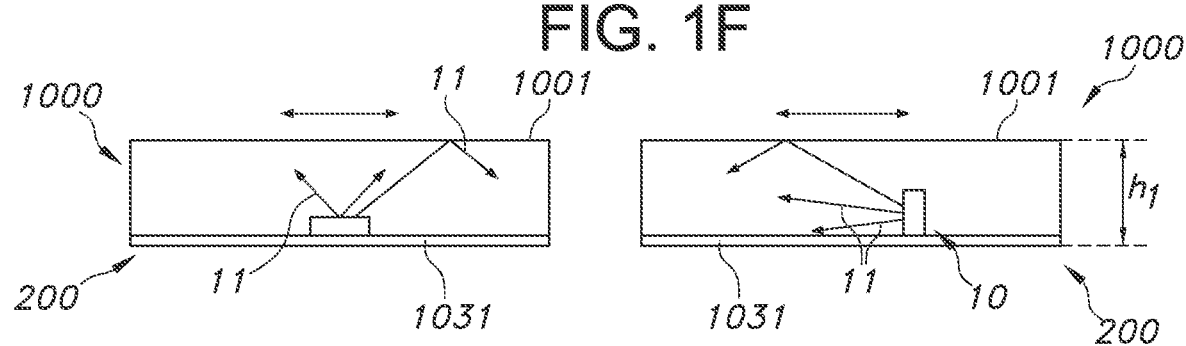
FIG. 2a schematically depicts direct lit without scattering (left) and side lit without scattering (right) (see also FIG. 2c)

FIG. 2a shows a direct lit (left picture) vs. a side lit (right picture) construction in silicone, essentially without deliberate introduction of scattering elements. The clean diameter or clean area, indicated with D, is limited by light guiding and the absorption of the silicone. Rays at larger angle than the critical angle, are total internally reflected and may not depart from the light guide at all. The clean diameter at the exit surface (assuming a threshold of $10^{-8}$ W/mm$^2$) is depending on the slab thickness, and shown in FIG. 2a for the direct and side lit system. Because it is expected that the direct lit system requires a thicker silicone medium than the side lit system to achieve enough anti-fouling area, simulations for the direct lit system are done for larger slab thickness (h1) 4-10 mm than for the side lit system (see FIG. 2a, right).

Figure 2B:
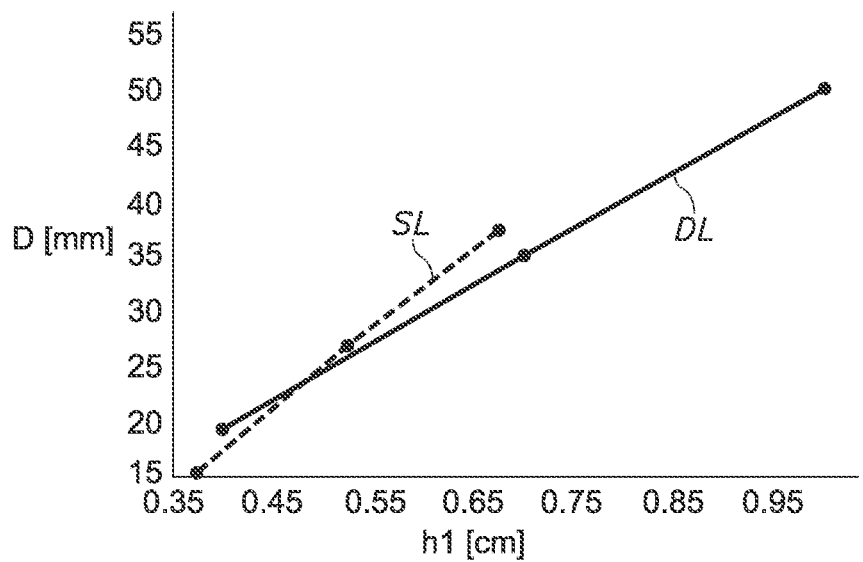
FIG. 2b shows that for small silicone thickness (around 4 mm), the anti-fouling diameter is only between 15 and 20 mm (threshold $10^{-8}$ W/mm$^2$), either for direct and side lit configurations.
Figure 2C:
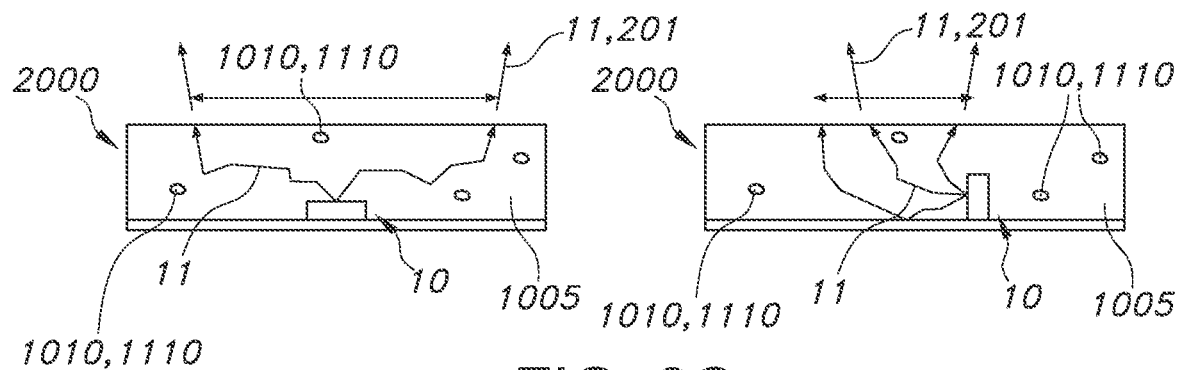
FIG. 2c schematically depicts direct lit with scattering (left) and side lit with scattering (right)

FIG. 2b shows the direct lit (DL) respectively side lit (SL) system with scattering. Additional scattering particles inside the silicone enable the radiation to reach the exit surface of the light guide before being absorbed by the silicone. Moreover, the redirected rays prevent rays being total internally reflected at the exit surface. Therefore, irradiance levels will be increased at the exit surface of the light guide and the clean diameter will be much larger than without scattering (compare clean diameter D at exit surface of FIG. 2a with 2c (threshold in simulation $10^{-8}$ W/mm$^2$). It suffices here to describe the scattering by a HG scattering function with a single mfp and g. In FIG. 2b, an (internal) transmission of 68.5% for a material thickness of 10 mm is assumed. The anti-fouling diameter is between 15 and 20 mm (threshold $10^{-8}$ W/mm$^2$), either for direct and side lit configurations, wherein for reference purposes silicone was evaluated without particles;

Referring to FIG. 2c, when a plurality of light sources 10 would be used the optical axes O may all be configured parallel but other options may also be possible. In the left embodiment, would a plurality of light sources be used, in general all light sources 10 may be configured similar, with the optical axis O perpendicular to a face. In the right embodiment, all light sources 10 may be configured similar, such as with the optical axis directing to left, but optionally one or more may also direct to the left (i.e. configured anti-parallel). Further, a combination of differently configured light sources 10 may be used, such as a plurality with a subset configured with optical axis perpendicular to one of the faces and a subset with optical axes configured essentially orthogonal to the optical axes of the light sources of the other subset.

Figure 2D:
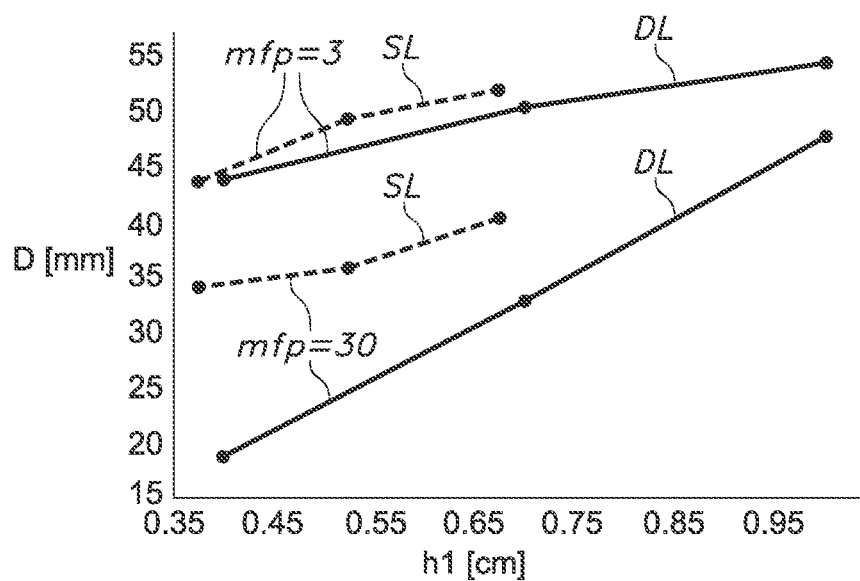
FIG. 2d shows that clean diameter of direct lit and side lit system vs. light guide thickness. Simulation are done for different scattering mean free path (mfp: 3 and 30 mm). Anisotropy factor g=0.85.
Figure 2E:
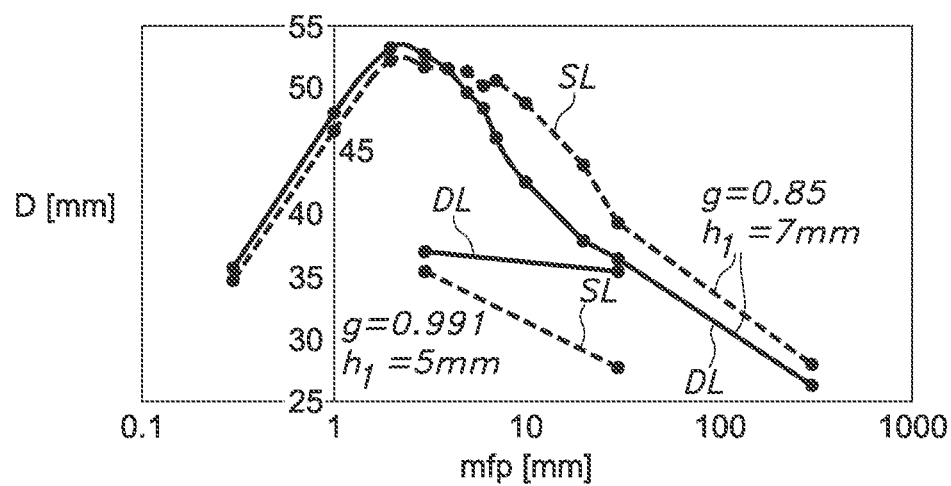
FIG. 2e shows the simulated clean diameter of direct lit and side lit system vs. mfp for light guide thickness of 7 and 5 mm for respectively the direct and side lit system. Simulations are now done with the Henyey-Greenstein model with an anisotropy factor g=0.85. An optimum mfp parameter can be found. Note that the mfp parameter is inversely proportional to the scattering particle concentration. Two simulations per system show that clean diameter decreases for g-factor of 0.991 (intense forward scattering)
Figure 2F:
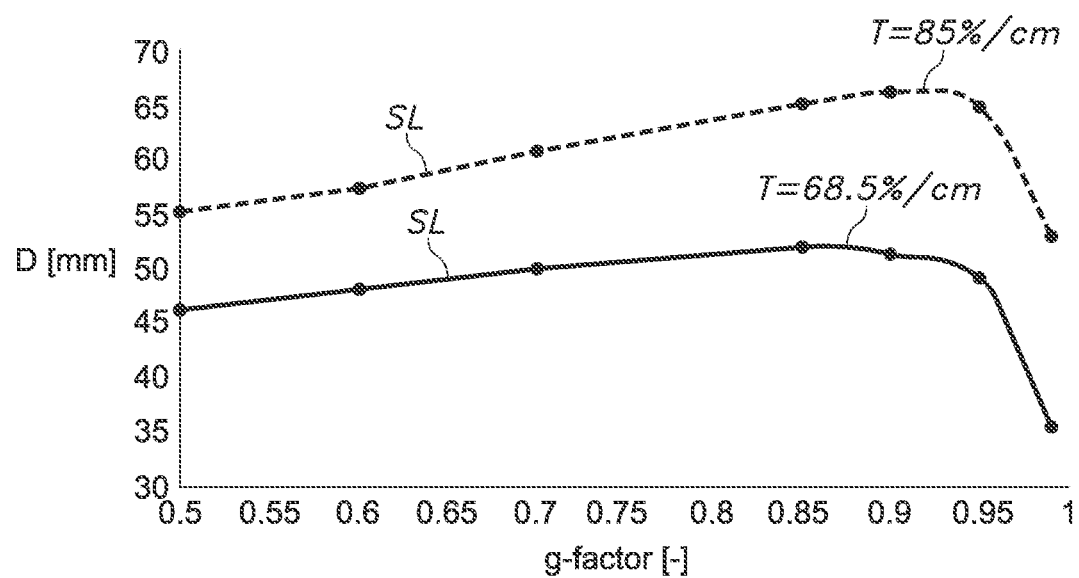
FIG. 2f shows the clean diameter of side lit system of 3 mm thickness and mfp=3 mm vs. g-factor. Simulations are done for two different transmissions (85% and 68.5% per cm)
Figure 2G:
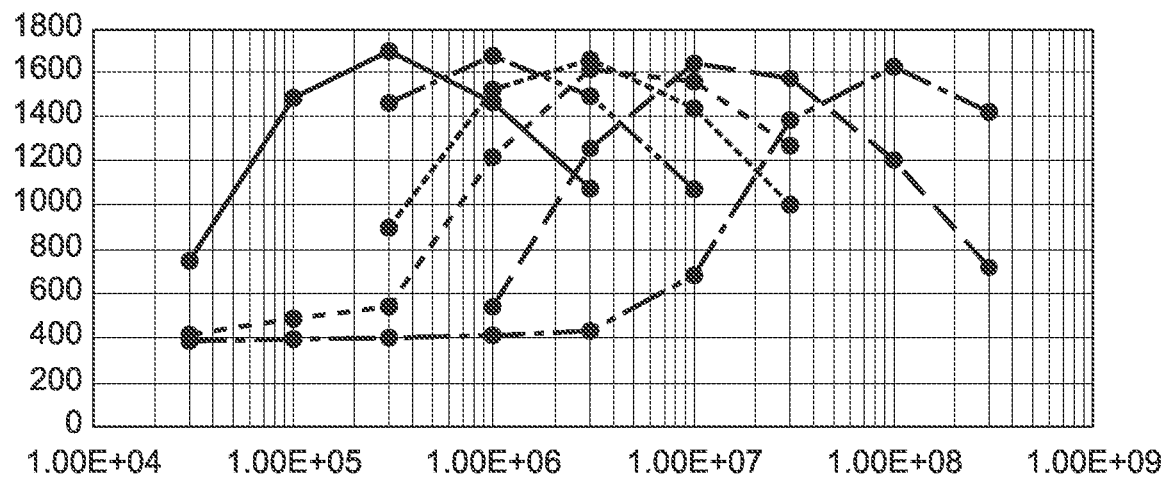
FIG. 2g shows the simulated clean area in a side lit system where the particle radius and concentration is varied. For each given particle radius, an optimum concentration can be found. Simulation is done with the Mie scattering model. In this example, the particle consists of air and the medium is Silicone. Similar curves have been obtained using as particles water and boron-nitride; threshold is $10^{-8}$ W/mm$^2$ and the light guide thickness is 8 mm; the internal transmission was about 68%/cm.

FIG. 2d shows that for a mean free path of 3 mm, the clean diameter increases to >45 mm for both the direct and side lit system with a silicone light guide thickness of 4 mm (compare with FIG. 2b). In FIG. 2d, an internal transmission of 68.5% is assumed. The dashed lines again refer to side-lit (SL) systems; the solid lines refer to direct-lit (DL) systems. In the simulation, mfp=3 (upper two curves) and mfp=3 (lower two curves) has been selected. Using the Henyey-Greenstein volume scattering model in the simulations, both the mfp and the g-factor can be optimized to achieve the largest possible clean diameter for a certain slab thickness. FIG. 2e the clean diameter versus mean free path (mm) for slab thicknesses (h1) of 7 and 5 mm, respectively, with side-lit systems (dashed lines) and direct-lit systems (solid line). FIG. 2e shows that the optimum can be found between 2-10 mm (mfp). The g-factor is 0.85 and for larger g-factor, the clean diameter decreases (red curves). FIG. 2f shows that the optimal g-factor can be found between 0.85 and 0.95. FIG. 2f shows a side-lit (SL) system with a slab height h1 of 3 mm and a mean free path mfp=3 mm. The transmission of silicone was selected 85%/1 cm for the upper curve and 68.5%/1 cm for the lower curve. FIG. 2g shows the clean area vs. particle density (concentration in particles/mm$^3$) of $H_2O$ in silicone Applications of the invention may amongst others include marine anti-fouling, keeping clean wetted surfaces, Offshore, (sub) sea, drilling platforms; any light guide which requires a more-or-less uniform outcoupling, even in visible light, etc.

Hence, in embodiments the invention provides an antifouling/antimicrobial system comprising a LED system with UV radiation embedded in a scattering light guide medium for achieving an antifouling/antimicrobial action, with scattering properties. Especially, thereby it is achieved that the scattering parameters of the scattering medium are optimized to achieve a larger anti-fouling area at the exit surface of the light guide. The invention further provides such antifouling/antimicrobial system where the scattering medium is silicone or fluoropolymer. Yet further, the invention provides such antifouling/antimicrobial system, where the scattering particles are of the type Boron Nitride (BN) or bariumsulphate ($BaSO_4$) with particle size and concentration chosen to obtain the scattering parameters of the medium.

Figure 3A:
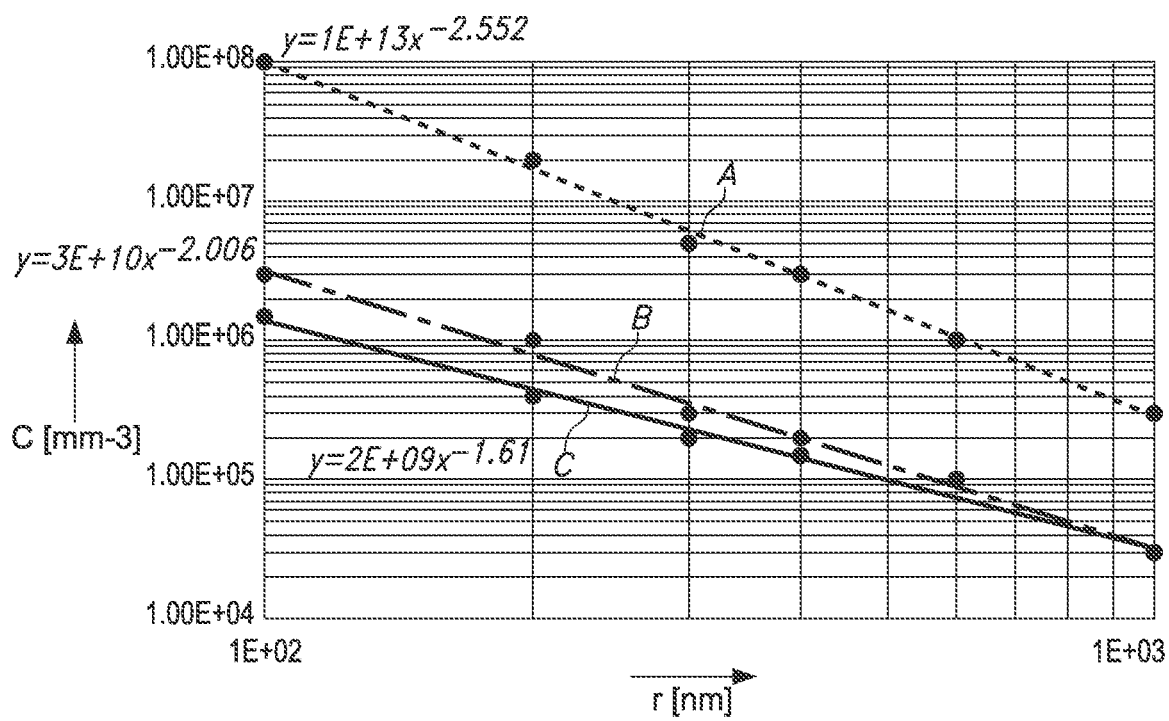
FIGS. 3a-3b schematically depict some simulation results.

FIG. 3a shows the (MIE) optimum concentration vs particle radius, with on the x-axis (logarithmic scale) the radius in nm and on the y-axis (logarithmic scale) the particle concentration in particles per mm$^3$. Curve A refers to water regions in silicone, curve B refers to air regions in silicone, and curve C refers to BN particles (regions) in silicone. Curves A+10% A and curve C-10% C define a ranges that may especially be suitable. Further, each curve +/−10% may define ranges for the specific materials that may especially be suitable, respectively. Indications like +/−10% A and similar indications may refer to they values that may be 10% larger or smaller.

Figure 3B:
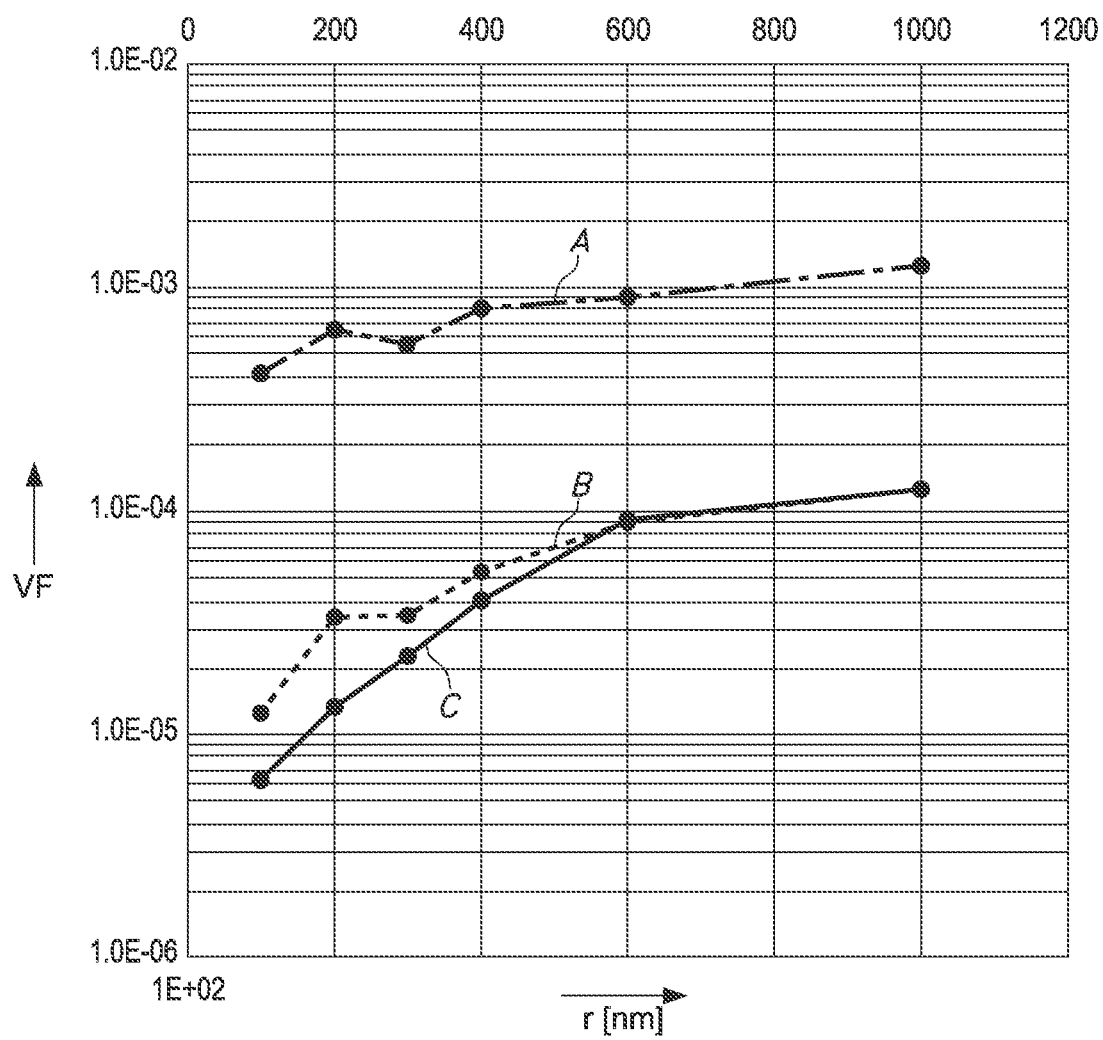

FIG. 3b schematically depicts the volume fraction (VF) versus particle size (in nm), with the x-axis with radius varying from 0-1200 nm, and with data between 100-1000 nm. The same materials as in FIG. 3a were used, and the same indications A-C are indicated in FIG. 3b. It appears that (mean) particle sizes below 600 nm, such as below 400 nm are of specific interest, since relatively few particles are needed to achieve an optimum result.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. An anti-biofouling system comprising a light source configured to provide UV radiation and a waveguide element, wherein the waveguide element comprises radiation transmissive material, wherein the waveguide element comprises a first face and a second face with the radiation transmissive material configured between the first face and the second face, wherein the radiation transmissive material is transmissive for the UV radiation, wherein the radiation transmissive material is a matrix material for a phase of another composition than the radiation transmissive material, wherein the phase is available in the matrix as regions with the regions having mean particle radii (r1) selected from the range of 350-1200 nm and having a volume fraction selected from the range of 0.01-0.2 vol. %, wherein the waveguide element has a plate-like shape, wherein the light source is at least partly embedded in the waveguide element, and wherein the light source and the waveguide element are adapted for propagation of at least part of the UV radiation through the radiation transmissive material and subsequent emanation from at least one of the first face and the second face.

2. The anti-biofouling system according to claim 1, wherein the radiation transmissive material comprises one or more of a silicone and a fluoropolymer.

3. The anti-biofouling system according to claim 1, wherein one or more regions consist of at least 80% vol. % of a gas.

4. The anti-biofouling system according to claim 1, wherein one or more regions consist of at least 80% vol. % of water.

5. The anti-biofouling system according to claim 1, wherein one or more regions consist of solid particles selected from the group consisting of silicon dioxide, aluminum oxide, titanium dioxide, boron nitride, magnesium oxide, barium sulphate, calcium carbonate, zirconium dioxide and zinc oxide.

6. The anti-biofouling system according to claim 1, wherein the radiation transmissive material and the phase have an absolute difference of indices of refraction selected from the range of 0.04-0.8, wherein the waveguide element has a thickness (h1) defined by the distance between the first face and the second face selected from the range of 0.5-200 mm, and wherein the radiation transmissive material comprises a silicone.

7. The anti-biofouling system according to claim 1, wherein the light source has an optical axis (O), wherein the light source is configured with the optical axis (O) perpendicular to one or more of the first face and the second face.

8. The anti-biofouling system according to claim 1, wherein the light source has an optical axis (O), wherein the light source is configured with the optical axis (O) parallel to one or more of the first face and the second face.

9. The anti-biofouling system according to claim 1, wherein the light source is configured to provide UVC radiation.

10. The anti-biofouling system according to claim 1, comprising a plurality of light sources, wherein each light source has a light emitting surface, and wherein the light sources have shortest distances (d1) between neighboring light emitting surfaces selected from the range of 1-50 mm.

11. The anti-biofouling system according to claim 1, wherein the UV radiation in the waveguide element has a mean free path selected from the range of 2-10 mm.

12. A combination of (i) an object comprising an object surface and (ii) the anti-biofouling system according to claim 1, wherein at least one of the first face and the second face of said anti-biofouling system is configured as at least part of said object surface, and wherein the anti-biofouling system is configured to provide the UV radiation emanating from said at least one of the first face and the second face.

13. The combination according to claim 12, wherein the object is selected from the group consisting of an immobile marine object, a mobile marine object, an infrastructural element, and a windmill.

14. A method of providing an anti-biofouling system as defined in claim 1 to an object, that during use is at least temporarily exposed to water, the method comprising providing the anti-biofouling system to the object with the anti-biofouling system configured to provide said UV radiation to one or more of a part of an object surface of the object and water adjacent to said part.

* * * * *